United States Patent
Tamura et al.

(10) Patent No.: US 8,999,517 B2
(45) Date of Patent: Apr. 7, 2015

(54) STEEL PIPE FOR VEHICLE PIPING

(75) Inventors: Yoshihisa Tamura, Koga (JP); Naoki Kawai, Kuki (JP)

(73) Assignee: Sanoh Kogyo Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 12/743,380

(22) PCT Filed: Nov. 20, 2008

(86) PCT No.: PCT/JP2008/071098
§ 371 (c)(1),
(2), (4) Date: May 18, 2010

(87) PCT Pub. No.: WO2009/066721
PCT Pub. Date: May 28, 2009

(65) Prior Publication Data
US 2010/0247947 A1    Sep. 30, 2010

(30) Foreign Application Priority Data
Nov. 21, 2007  (JP) .................. 2007-301717

(51) Int. Cl.
| | |
|---|---|
| *B32B 1/08* | (2006.01) |
| *B32B 15/04* | (2006.01) |
| *B32B 15/088* | (2006.01) |
| *B32B 15/18* | (2006.01) |
| *C23C 28/00* | (2006.01) |
| *F02M 37/00* | (2006.01) |
| *F16L 9/147* | (2006.01) |
| *F16L 58/10* | (2006.01) |

(52) U.S. Cl.
CPC . *C23C 28/00* (2013.01); *B32B 1/08* (2013.01); *F02M 37/0017* (2013.01); *F16L 9/147* (2013.01); *F16L 58/109* (2013.01)

(58) Field of Classification Search
CPC .......... B32B 1/08; B32B 15/01; B32B 15/04; B32B 15/088; B32B 15/092; B32B 15/18; B32B 2597/00; C23C 28/00
USPC ........ D12/180; 428/624, 658, 659, 684, 34.1, 428/336, 459, 474.4, 478.2, 414, 418
See application file for complete search history.

(56) References Cited

U.S. PATENT DOCUMENTS

2004/0028921 A1* 2/2004 Amouroux .................... 428/459

FOREIGN PATENT DOCUMENTS

| CN | 1448262 A | 10/2003 |
|---|---|---|
| JP | 5-277435 A | 10/1993 |

(Continued)

OTHER PUBLICATIONS

Burton Bike Bits; "Petrol (Fuel) Tank Taps and Petrol Pipe Assemblies"; www.burtonbikebits.net/Taps.htm; Oct. 23, 2007; Accessed Oct. 18, 2011.*
Sharma, et al., "Curing of Epoxy Resin Using Imide-Amines," in J. Applied Polymer Science, vol. 101, 3503-3510 (2006) (no month).*
Non-English Action from the Chinese Patent Office in respect of corresponding Application No. 200880117294.9 and an English-language version.

(Continued)

*Primary Examiner* — Michael E La Villa
(74) *Attorney, Agent, or Firm* — Ladas & Parry LLP

(57) ABSTRACT

A steel pipe has a multi-layer coating including: a plating film formed on the surface of the steel pipe; a chemical conversion coating covering the plating film; a primer coating covering the chemical conversion coating and formed from a curable epoxy resin composition composed mainly of an epoxy compound and having an amide or imide bond introduced; and a polyamide resin coating covering the primer coating. The multi-layer coating can significantly enhance the adhesion force of the polyamide coating compared to the conventional pipe.

11 Claims, 1 Drawing Sheet

(56) References Cited

FOREIGN PATENT DOCUMENTS

| | | |
|---|---|---|
| JP | 2003-291253 A | 10/2003 |
| JP | 2004-232010 A | 8/2004 |
| JP | 2009-001648 A | 1/2009 |
| WO | 2007/052683 A1 | 5/2007 |
| WO | 2009/007809 A1 | 1/2009 |

OTHER PUBLICATIONS

Espacenet English abstract of WO 2007/052683 A1.
Espacenet English abstract of CN 1448262 A.
Japanese Office Action Issued on September 14, 2012 With English Translation.
Patent English Abstract of Japanese Application 2009-001648A Published Jan. 8, 2009.

* cited by examiner

STEEL PIPE FOR VEHICLE PIPING

TECHNICAL FIELD

The present invention relates to an automotive steel pipe for use in automotive piping, such as fuel piping or brake piping.

BACKGROUND ART

An automotive steel pipe is required to possess high properties with respect to corrosion resistance and chemical resistance. To provide an automotive steel pipe having enhanced corrosion resistance, it is common practice to cover the surface of a steel pipe with a zinc plating film and cover the plating film with a chromate conversion coating.

Automotive piping generally runs in the bottom of an automotive body and extends to an engine. An automotive steel pipe, therefore, needs to possess high chipping resistance so that a plating film will not be damaged e.g. by a pebble bouncing off the road and hitting the pipe.

FIG. 3 is a cross-sectional diagram of a conventional automotive steel pipe. In the conventional automotive steel pipe, the surface of a steel pipe 1 is coated with a zinc plating film 2 having a thickness of 1 to 100 μm, a chromate conversion coating layer 3 is formed on the zinc plating film 2, and the coating layer 3 is coated via a primer 4 with a resin layer 5 having a thickness of 50 to 300 μm.

Although such a conventional automotive steel pipe has a sufficient corrosion resistance due to the plating film 2, it is weak against impact e.g. when it is hit by a pebble. In the case of an automotive steel pipe for which chipping resistance is required to prevent damage to the plating film, it is necessary to make the outermost resin layer 5 as thick as possible to protect the zinc plating film 2. A fluororesin is most commonly used for the resin layer 5. In conventional practice, a primer, comprising an epoxy resin, is applied to the chromate conversion coating layer 3, followed by baking, and thereafter the resin layer 5 is formed by extrusion.

Instead of the costly fluororesin, a polyamide resin, which is relatively inexpensive and has a high strength, has recently been used for the outermost resin layer of an automotive steel pipe. When a polyamide resin coating is employed, in order to enhance the adhesion of the coating to a primer, an epoxy-based resin having a three-dimensional crosslinking structure is used as a primer, or an adhesion-imparting agent is mixed into a polyamide resin.

DISCLOSURE OF THE INVENTION

With the recent growing concern about environmental issues, biomass fuels are becoming more and more widely used. The spread of a gasoline fuel containing an alcohol has revealed an unexpected problem concerning a steel pipe for use in automotive fuel piping.

When the above-described steel pipe, having a polyamide resin coating as the outermost resin layer 5, is used in fuel piping, a fuel contacts the resin layer 5 at a terminal joint portion of the fuel piping at which the piping is fastened to its counterpart. In the case of the conventional fuel, consisting solely of gasoline, contact of the fuel with the resin layer 5 entails no significant problems.

On the other hand, in the case of a fuel which is a mixture of gasoline with an alcohol, the alcohol adversely affects the polyamide resin coating and the epoxy primer, causing a lowering of the adhesion of the resin coating. This leads to poor fastening of the piping to the counterpart, resulting in fuel leakage.

It has been confirmed by the present inventors that when the conventional coated steel pipe is allowed to be in contact with an alcohol fuel containing methanol in an amount of not less than 30% (vol. %) at a temperature of not less than 80° C. for at least 72 hours, the primer loses its adhesive force and the polyamide coating is brought into a state in which the polyamide coating can peel off without applying a force, i.e. the adhesion force of the polyamide coating is zero.

In such a zero adhesion state, there is a possibility of the occurrence of a so-called tunnel leakage phenomenon in which a fuel penetrates between the polyamide coating and the metal surface and an O-ring, provided on the surface of the polyamide coating and sealing the terminal fastening portion, does not work and the fuel leaks to the outside.

The conventional automotive steel pipe also has the following problem: Automotive steel pipes need various types of terminal processing, such as flaring and bulging, for connection with a joint. Such terminal processing involves severe plastic deformation. Accordingly, peeling of the polyamide coating can occur upon terminal processing depending on the type of the processing.

It is therefore an object of the present invention to solve the above problems in the prior art and provide a steel pipe for automotive piping which can significantly enhance the adhesion force of a polyamide coating as compared to the conventional pipe and can maintain the adhesion between the polyamide coating and the metal surface even when the polyamide coating contacts gasoline mixed with a high-concentration alcohol.

It is another object of the present invention to provide a steel pipe for automotive piping which, by enhancing the adhesion force of a polyamide coating to such a level that the coating will not peel off upon various types of terminal processing, can be subjected to terminal processing carried out under more severe conditions.

In order to achieve the objects, the present invention provides a steel pipe for automotive piping, comprising a steel pipe coated with a multi-layer coating including a plating film, wherein the multi-layer coating comprises: a plating film formed on the surface of the steel pipe; a chemical conversion coating covering the plating film; a primer coating covering the chemical conversion coating and formed from a curable epoxy resin composition composed mainly of an epoxy compound and having an amide or imide bond introduced; and a polyamide resin coating covering the primer coating.

In the present invention, a curable epoxy resin composition comprising a mixture of a curable epoxy resin as a base material and a resin having an amide or imide bond, or a curable epoxy resin composition comprising a curable epoxy resin with a crosslinking structure of amide or imide bond introduced.

In the present invention, the thickness of the primer coating is preferably 0.5 to 20 μm. The chemical conversion coating preferably is a chromium-free chemical conversion coating containing no chromium.

According to the present invention, the adhesion between the polyamide coating and the primer coating can be significantly enhanced compared to the conventional pipe. Further, the adhesion force of the polyamide coating can be maintained even when the polyamide coating contacts gasoline mixed with a high-concentration alcohol at any high alcohol concentration and any high temperature.

In addition, according to the present invention, the adhesion force of the polyamide coating can be enhanced to such a level that the polyamide coating will not peel off even when the pipe end is subjected to various types of metal processing, and therefore the pipe end can undergo processing carried out under more severe conditions.

BEST MODE FOR CARRYING OUT THE INVENTION

Preferred embodiments of the present invention will now be described with reference to the drawings.

Figure 1:
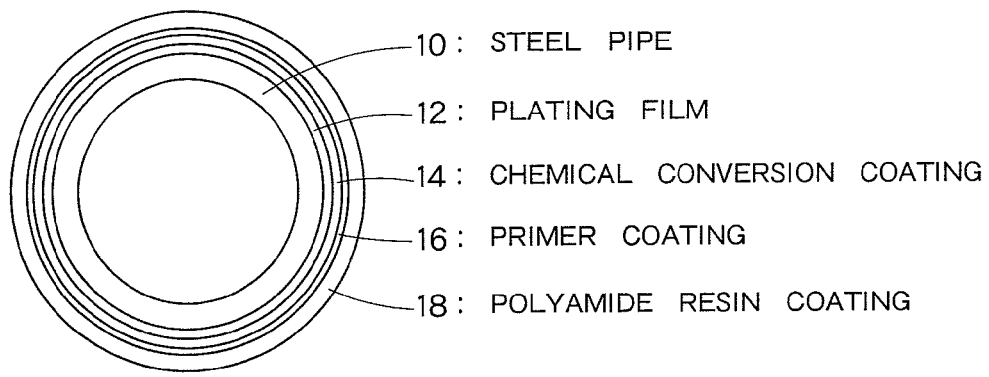
FIG. 1 is a cross-sectional diagram of an embodiment of a steel pipe for automotive piping according to the present invention.

FIG. 1 is a diagram showing a cross-section of a steel pipe for automotive piping according to an embodiment of the present invention. In FIG. 1, reference numeral 10 denotes a steel pipe. In this embodiment the steel pipe 10 is a steel pipe, having an outside diameter of 8 mm, for use as a base pipe in automotive piping, such as fuel piping and brake piping. The resent invention can also be applied to pipes or tubes having various sizes in the range of 4 to 42 mm.

The outer peripheral surface of the steel pipe 10 is entirely coated with a plating film 12. The plating film 12 preferably is a zinc plating film, and may be formed either by electroplating or by hot-dip plating.

A chemical conversion coating 14 is formed on the entire surface of the plating film 12. The chemical conversion coating 14 may be formed by a chemical conversion treatment using a chromium-free chemical conversion treatment solution containing no chromium compound, such as a hexavalent chromium compound.

In the steel pipe for automotive piping of this embodiment, the surface of the chemical conversion coating 14 is coated with a polyamide resin coating 18 via a primer coating 16 so as to enhance the adhesion to the resin coating 18. PA 11 or PA 12 can preferably be used as a resin material.

A curable epoxy resin composition composed mainly of an epoxy compound and having an amide or imide bond introduced is used as a material for the primer coating 16. As the curable epoxy resin composition may be used a curable epoxy resin composition comprising a mixture of a curable epoxy resin as a base material and a resin having an amide or imide bond, or a curable epoxy resin composition comprising a curable epoxy resin with a crosslinking structure of amide or imide bond introduced.

The primer coating 16 can be formed by dissolving the above resin composition (molecular weight Mn not more than 100,000) in an organic solvent, and applying the solution to the coating 14 in such an amount as to make the thickness of the primer coating 16 after drying 0.5 to 20 μm, preferably 1 to 10 μm, followed by drying and baking at a surface temperature of not less than 200° C.

The uppermost polyamide resin coating 18, having a thickness in the range of 50 to 300 μm, can be formed by extrusion coating.

According to the steel pipe thus constructed, owing to the coating structure consisting of the combination of the plating film 12, the chemical conversion coating 14, the primer coating 16 formed from a curable epoxy resin composition composed mainly of an epoxy compound and having an amide or imide bond introduced, and the polyamide resin coating 18, the adhesion strength between the polyamide resin coating 18 and the steel pipe can be significantly enhanced compared to the conventional coated steel pipe in which a mere epoxy resin is used as a primer material.

This is considered to be due to the fact that the interfacial adhesion between polyamide and the chemical conversion coating 14 is enhanced by the use of the curable epoxy resin composition having an amide or imide bond introduced, and that the primer coating 16 itself has an increased strength.

It has been confirmed in this connection that the enhancement of the adhesion strength of the polyamide resin coating 18 cannot be achieved by only using, instead of the curable epoxy resin composition, a resin having an amide or imide bond as a material for the primer coating 16.

Figure 2:
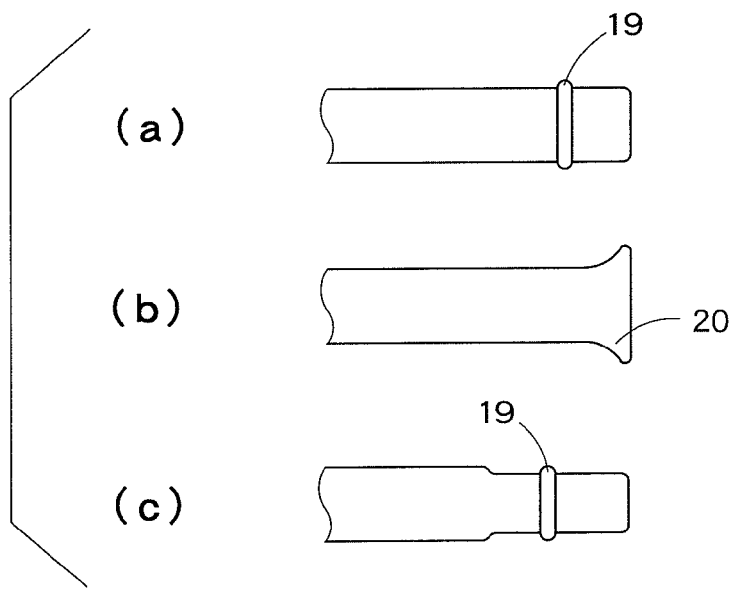
FIGS. 2A through 2C are diagrams illustrating exemplary terminal processing of the steel pipe for automotive piping.
Figure 3:
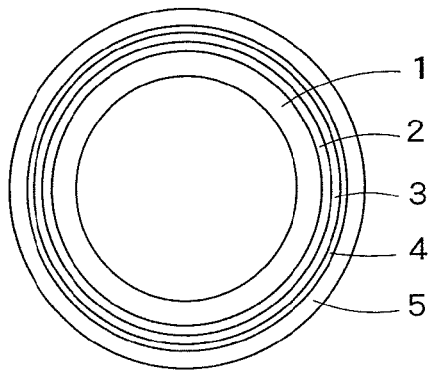
FIG. 3 is a cross-sectional diagram of a conventional steel pipe for automotive piping.

Because of the significantly enhanced adhesion strength of the polyamide resin coating 18, the steel pipe for automotive piping of this embodiment, when used in automotive fuel piping, can produce the following advantageous effects:

When a coated steel pipe is to be used in fuel piping, the pipe end is subjected to metal processing to process the pipe end into various shapes, such as a spool 19, a circumferentially extending raised portion, as shown in FIG. 2A, and a flare 20 as shown in FIG. 2B. According to the steel pipe for automotive piping of this embodiment, peeling of the polyamide resin coating 18 upon such terminal processing can be prevented, thus eliminating the production of defective products.

Further, severe processing such as drawing, which is difficult to use for the conventional coated steel pipe because of peeling of a resin coating, becomes possible. Thus, as shown in FIG. 2C, a pipe, e.g. having an outside diameter of 10 mm, can be narrowed at its end e.g. into 8 mm by drawing.

In addition, it has been found that the adhesion between the polyamide resin coating 18 and the steel pipe does not become zero even when the coated pipe contacts a gasoline fuel containing an alcohol at a high concentration, which is expected to be more widely used in the future, at any mixing ratio and any temperature. This is a remarkable effect which has never been known in conventional coated steel pipes of this type. Further, this can prevent the occurrence of a so-called tunnel leakage phenomenon in which a fuel penetrates between a resin coating and a steel pipe and, despite an O-ring provided at a joint portion, the fuel leaks out through the gap between the resin coating and the surface of the steel pipe, lying under the sealing face of the O-ring. The alcohol-resistant effect will be further described below with reference to working examples.

Because of the enhancement of the adhesion strength of the polyamide resin coating 18, a deep scratch that reaches the surface of the steel pipe is less likely to be produced e.g. when a pebble hits the fuel piping. The chipping resistance of the fuel piping is thus enhanced. This also enhances the corrosion resistance.

When the steel pipe for automotive piping of this embodiment is used in automotive brake piping, the problem of resin coating peeling upon terminal processing can be solved as in the case of fuel piping. In the case of brake piping, because of the high pressure in operation, it is necessary to strongly fasten a joint portion e.g. by means of a flare nut, which has led to the problem of breakage of a resin coating in the conventional pipe. The steel pipe of this embodiment has the advantage that the polyamide resin coating 18 is less likely to break even when a joint portion is strongly fastened.

Examples

Examples of the present invention will now be described with reference to Table 1.

TABLE 1

| | Fuel | | | | | | |
|---|---|---|---|---|---|---|---|
| | E10 | | | E30 | | | |
| | Temp. | | | Temp. | | | |
| | RT | 60° C. | 100° C. | RT | 60° C. | 80° C. | 100° C. |
| Ex. 1 | 6.0 | 2.5 | 1.5 | 5.0 | 3.5 | 2.0 | 2.0 |
| Ex. 2 | 6.5 | 3.0 | 2.5 | 5.0 | 5.0 | 2.5 | 2.0 |
| Ex. 3 | 7.0 | 4.2 | 3.0 | 5.5 | 5.0 | 3.0 | 3.0 |
| Comp. Ex. 1 | 1.0 | 0.5 | 0.5 | 1.5 | 0.5 | 0.0 | 0.0 |
| Comp. Ex. 2 | 1.5 | 1.0 | 0.0 | 1.0 | 0.5 | 0.0 | 0.0 |

(N/2 mm)

| | Fuel | | | | | | |
|---|---|---|---|---|---|---|---|
| | E85 | | | E100 | | | |
| | Temp. | | | | | | Initial |
| | RT | 60° C. | 100° C. | RT | 60° C. | 100° C. | Force |
| Ex. 1 | 5.5 | 2.0 | 2.0 | 5.5 | 3.0 | 2.5 | 10< |
| Ex. 2 | 6.0 | 4.0 | 2.0 | 6.0 | 4.0 | 2.5 | 10< |
| Ex. 3 | 6.5 | 4.0 | 2.5 | 6.0 | 4.0 | 2.5 | 10< |
| Comp. Ex. 1 | 1.5 | 0.5 | 0.0 | 1.5 | 0.5 | 0.0 | 3-7 |
| Comp. Ex. 2 | 1.5 | 0.5 | 0.0 | 1.5 | 0.5 | 0.0 | 3-7 |

In Examples 1 to 3, a coated tube was produced by carrying out chromium-free chemical conversion treatment of a zinc-coated steel tube having an outside diameter of 8 mm to form a chemical conversion coating, applying a primer to the chemical conversion coating in such an amount that the thickness of the primer coating after drying will be 1 to 10 μm, carrying out baking of the coated tube at 200° C., and then forming a coating of PA11, having a thickness of 150 μm, by extrusion on the primer coating. Different primer materials were used in the Examples.

In Example 1, a curable epoxy resin composition composed of a bisphenol A epoxy resin (EPICLON 7050, manufactured by DNC Corp.) and polyimide (U-Varnish, manufactured by UBE Industries, Ltd.) contained in an amount of 10 to 20% of the amount of the epoxy resin, was used as a primer material.

In Example 2, a curable epoxy resin composition composed of the bisphenol A epoxy resin (EPICLON 7050, manufactured by DNC Corp.) and polyamide (2015, manufactured by ThreeBond Co., Ltd.) contained in an amount of 10 to 20% of the amount of the epoxy resin, was used as a primer material.

In Example 3, a curable epoxy resin composition composed of the bisphenol A epoxy resin (EPICLON 7050, manufactured by DNC Corp.) and polyamideimide (VYLO-MAX HR, manufactured by TOYOBO Co., Ltd.) contained in an amount of 10 to 20% of the amount of the epoxy resin, was used as a primer material.

A peel adhesion force was measured for each coated tube in the following manner:

Four types of ethanol-containing gasoline fuels, containing ethanol at a concentration (vol. %) of 10% (referred to as E10), 30% (referred to as E30), 85% (referred to as E85) and 100% (referred to as E100), were prepared. Each of the tubes of Examples 1 to 3 was immersed in each fuel for 72 hours while keeping the fuel at room temperature, 60° C., 80° C. or 100° C. Thereafter, the polyamide resin coating of each tube was cut with a knife in the axial direction of the tube to create a cut about 2 mm long. A peel adhesion force was determined by measuring the force necessary to peel the resin coating off the tube.

A peel adhesion force was measured also for tubes of Comparative Examples. The tube of Comp. Example 1 uses the epoxy resin alone as a primer material. The tube of Comp. Example 2 is another comparable conventional tube.

As can be clearly seen from Table 1, the initial peel adhesion forces of the tubes of Examples 1 to 3 are all higher than those of the comparative conventional tubes. Further, the tubes of Examples exhibit higher peel adhesion forces than the conventional tubes after contact with the respective fuels, especially at room temperature.

As can also be seen from the data, the peel adhesion forces of the tubes of Comp. Examples 1 and 2 can become zero after contact with the fuels at the high temperatures, whereas the tubes of Examples 1 to 3 maintain a certain level of peel adhesion force. In addition, the tubes of Examples 1 to 3 can maintain a certain level of peel adhesion force for the varying ethanol concentrations of the fuel.

The invention claimed is:

1. A coated pipe for automotive piping, comprising a steel pipe coated with a multi-layer coating, wherein the multi-layer coating comprises: a plating film formed on the surface of the steel pipe; a chemical conversion coating covering the plating film; a primer coating covering the chemical conversion coating and a polyamide resin coating covering the primer coating; wherein the primer coating is made by baking a curable composition composed mainly of a curable epoxy resin but also comprising a polyamide imide to form the primer coating as a baked composition that provides for enhanced adhesion of the primer coating to the polyamide resin coating as compared with the baked composition if made by baking the curable composition except that the curable composition does not comprise any polyamide imide.

2. The coated pipe for automotive piping according to claim 1, wherein the thickness of the primer coating is 0.5 to 20 μm.

3. The coated pipe for automotive piping according to claim 1, wherein the chemical conversion coating is a chromium-free chemical conversion coating containing no chromium.

4. The coated pipe for automotive piping according to claim 1, wherein the plating film is a zinc plating film formed by electroplating or hot-dip plating.

5. The coated pipe for automotive piping according to claim 1, wherein the polyamide resin coating is composed of PA11 or PA12.

6. The coated pipe for automotive piping according to claim 1, wherein the steel pipe has an end portion which has undergone metal processing to process the pipe end into a predetermined shape.

7. The coated pipe for automotive piping according to claim 6, wherein the steel pipe has a spool, a circumferentially extending raised portion, at the end portion.

8. The coated pipe for automotive piping according to claim 6, wherein the steel pipe has a flare at the end portion.

9. The coated pipe for automotive piping according to claim 6, wherein the end portion of the steel pipe has undergone drawing.

10. The coated pipe for automotive piping according to claim 1 wherein the coated pipe is disposed in automotive brake piping or fuel piping of an automobile.

11. A coated pipe for use in fuel piping wherein it can come into contact with gasohol, the coated pipe comprising a steel pipe coated with a multi-layer coating, wherein the multi-layer coating comprises:
  (a) a plating film formed on a surface of the steel pipe,
  (b) a chemical conversion coating covering the plating film;
  (c) a primer coating covering the chemical conversion coating and a polyamide resin coating covering the primer coating; wherein the primer coating is formed by baking a curable composition composed mainly of a curable epoxy resin but also comprising a polyamide imide to form the primer coating as a baked composition that provides for enhanced adhesion of the primer coating to the polyamide resin coating as compared with the baked composition if made by baking the curable composition except that the curable composition does not comprise any polyamide imide.

\* \* \* \* \*